(12) United States Patent
Mackiewicz (10) Patent No.: US 8,677,746 B2
(45) Date of Patent: Mar. 25, 2014

(54) MASTER CYLINDER AND BRAKE BOOSTER ASSEMBLY

(75) Inventor: John E. Mackiewicz, Niles, MI (US)

(73) Assignee: Robert Bosch GmbH, Stuttgart (DE)

(*) Notice: Subject to any disclaimer, the term of this patent is extended or adjusted under 35 U.S.C. 154(b) by 868 days.

(21) Appl. No.: 12/874,262

(22) Filed: Sep. 2, 2010

(65) Prior Publication Data
US 2012/0055150 A1  Mar. 8, 2012

(51) Int. Cl.
*F15B 7/08* (2006.01)
*B60T 13/00* (2006.01)

(52) U.S. Cl.
USPC .................................. 60/547.1; 60/588

(58) Field of Classification Search
USPC ............... 60/547.1, 552, 588; 83/635
See application file for complete search history.

(56) References Cited

U.S. PATENT DOCUMENTS

| | | | |
|---|---|---|---|
| 1,764,179 A * | 6/1930 | Loughead | 60/588 |
| 3,541,909 A * | 11/1970 | Franzen | 83/635 |
| 3,678,687 A | 7/1972 | Watabe et al. | |
| 4,201,057 A | 5/1980 | Martin | |
| 4,307,570 A | 12/1981 | Yardley | |
| 4,433,614 A * | 2/1984 | Takeuchi et al. | 60/547.1 |
| 4,455,827 A | 6/1984 | Margetts | |
| 5,233,833 A | 8/1993 | Last, Jr. et al. | |
| 5,797,264 A | 8/1998 | Verbo et al. | |
| 6,928,815 B2 * | 8/2005 | Ishida | 60/588 |
| 2004/0148930 A1 | 8/2004 | Mita et al. | |

FOREIGN PATENT DOCUMENTS

| | | |
|---|---|---|
| EP | 0046339 A1 | 2/1982 |
| EP | 0185165 A1 | 6/1986 |
| EP | 0274268 A2 | 7/1988 |
| GB | 1455316 A | 11/1976 |
| GB | 2170289 A | 7/1986 |
| WO | 2009154822 A2 | 12/2009 |

OTHER PUBLICATIONS

European Search Report in corresponding European patent application (i.e., 11179225.5), completed Dec. 20, 2011 (4 pages).

* cited by examiner

*Primary Examiner* — Michael Leslie
(74) *Attorney, Agent, or Firm* — Maginot, Moore & Beck (57) ABSTRACT

A brake booster includes a housing, a retention cuff, and a spring. The housing defines a passage to an interior chamber. The retention cuff is positioned in the interior chamber about the passage. The spring engages the retention cuff in the interior chamber. The master cylinder arrangement includes a tube member and a brake fluid reservoir. The tube member includes a first end and a second end. The tube member extends through the passage and the retention cuff such that the first end of the tube member is exposed to the interior chamber of the brake booster. The brake fluid reservoir is in fluid communication with the tube member.

17 Claims, 8 Drawing Sheets

MASTER CYLINDER AND BRAKE BOOSTER ASSEMBLY

FIELD OF THE INVENTION

The present disclosure relates generally to braking systems, and in particular to a master cylinder and a brake booster for a braking system.

BACKGROUND OF RELATED ART

Vehicles often include a hydraulic braking system for reducing the speed of the vehicle and/or maintaining the vehicle in a stopped position. Typically, a hydraulic braking system includes a pneumatic/vacuum brake booster having an output rod, which is received by a master cylinder. Hydraulic brake lines fluidly couple the master cylinder to one or more hydraulic brake wheel cylinders. The brake booster receives a pedal rod, which is coupled to a brake pedal positioned within a cabin of the vehicle. In operation, the brake booster reduces the force required to activate the braking system by amplifying a force exerted on the brake pedal by an operator of the vehicle. The brake booster transmits the amplified force through the output rod to one or more pistons within the master cylinder. Movement of the pistons within the master cylinder provides fluid under pressure to each brake wheel cylinder through the hydraulic brake lines. Each of the brake wheel cylinders that receives the fluid under pressure, moves a friction material against a rotor or drum associated with a wheel and tire assembly of the vehicle. Moving the friction material against the rotor or drum decelerates the vehicle and/or maintains the vehicle in a stopped position. In response to the vehicle operator releasing the force upon the brake pedal, such that the brake pedal moves in a release direction to a deactivated position, the output rod of the brake booster and the master cylinder pistons move in the release direction, which deactivates the hydraulic brake wheel cylinders and permits the drum, rotor, wheel and tire assembly, and/or other elements to rotate freely.

In general, the brake booster includes a housing, the output rod, a diaphragm, and a valve. The diaphragm, which is coupled to the output rod, divides an internal cavity of the housing into a booster chamber and a vacuum chamber. The brake booster couples vacuum generated by a gasoline engine or a vacuum pump to the vacuum chamber, in order to maintain the vacuum chamber at a pressure less than the atmospheric pressure. The valve controls fluid flow between a working chamber portion and an atmosphere chamber portion of the booster chamber. Biasing members maintain the valve in a closed position, which separates the working chamber from the atmosphere chamber. When the valve is closed, the brake booster supplies vacuum to the working chamber, in order to maintain the working chamber and the vacuum chamber at the same pressure level. The approximately equal pressure on each side of the diaphragm causes the diaphragm to remain stationary. The valve opens in response to the vehicle operator exerting a force on the brake pedal and, in response, the negative pressure within the working chamber draws air from the atmosphere through the atmosphere chamber and the valve and into the working chamber. Therefore, when the valve is open the pressure in the working chamber becomes greater than the pressure in the vacuum chamber. The imbalance of pressure between the vacuum chamber and the working chamber tends to move the diaphragm and the output rod in the direction, which activates the hydraulic brake wheel cylinders. Accordingly, the imbalance of pressure amplifies the force exerted on the brake pedal and makes the braking system easier for users to operate.

Master cylinder and brake booster arrangements include numerous parts, making the arrangements relatively expensive and complicated to manufacture and assemble. Accordingly, there is a continuing need in the art to provide a master cylinder and brake booster arrangement, which is less complicated to manufacture and assemble and is therefore less expensive, more compact, and more reliable.

SUMMARY

In accordance with one embodiment of the present disclosure there is provided a brake system including a brake booster and a master cylinder arrangement. The brake booster includes a housing, a retention cuff, and a spring. The housing defines a passage to an interior chamber. The retention cuff is positioned in the interior chamber about the passage. The spring engages the retention cuff in the interior chamber. The master cylinder arrangement includes a tube member and a brake fluid reservoir. The tube member includes a first end and a second end. The tube member extends through the passage and the retention cuff such that the first end of the tube member is exposed to the interior chamber of the brake booster. The brake fluid reservoir is in fluid communication with the tube member.

In accordance with another embodiment of the present disclosure there is provided a brake system including a brake booster, a master cylinder arrangement, a brake fluid reservoir, and a plug. The brake booster includes a housing defining a passage to an interior chamber. The master cylinder arrangement includes a tube member having a first opening at a first end and an opposing second opening at a second end. The tube member extends through the passage in the brake booster such that the first end of the tube member is exposed to the interior chamber of the brake booster. The brake fluid reservoir is in fluid communication with the tube member. The plug covers the second opening in the tube member and includes a brake line port configured to allow brake fluid to flow from an interior of the tube member to an exterior of the tube member.

A method has been developed of forming a port in a master cylinder tube member. The method includes engaging the master cylinder tube member with a support frame such that a first portion of the support frame is positioned within a channel of the master cylinder tube member and a second portion of the support frame is positioned to overlap a portion of an exterior surface of the master cylinder tube member, and piercing the tube member with a port forming member from within the channel to form a port in the master cylinder tube member, the port forming member being slidably received by the first portion of the support frame.

BRIEF DESCRIPTION OF THE FIGURES

Features of the present invention should become apparent to those of ordinary skill in the art to which this device pertains from the following description with reference to the figures, in which.

DETAILED DESCRIPTION

For the purpose of promoting an understanding of the principles of the system described herein, this disclosure makes reference to the embodiments illustrated in the figures and described in the following written specification. It should be understood that no limitation to the scope of the system is thereby intended. It should be further understood that the system includes any alterations and modifications to the illustrated embodiments and includes further applications of the principles of the system as would normally occur to one of ordinary skill in the art to which this system pertains.

Figure 1:
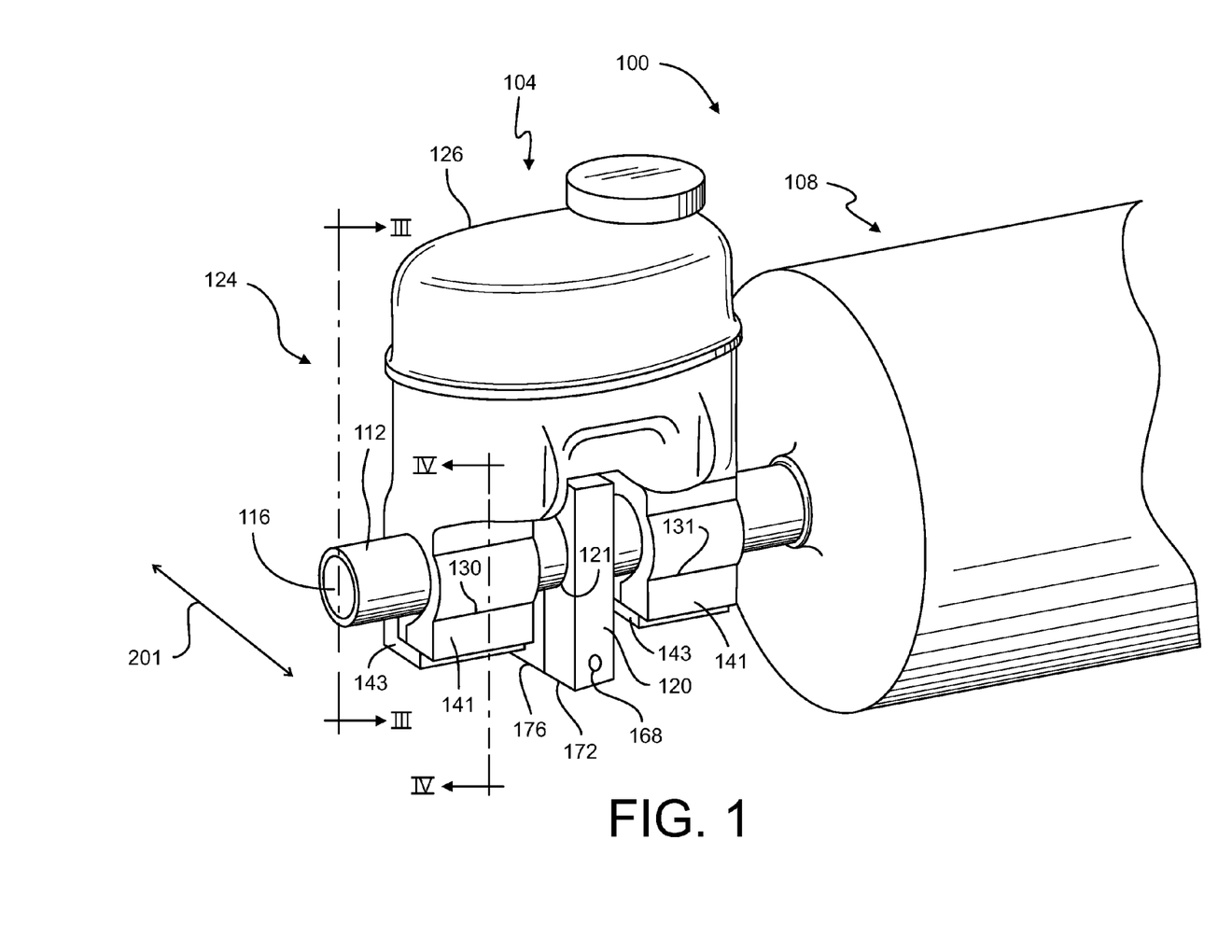
FIG. 1 is a perspective view of a braking system having a brake booster and a master cylinder arrangement.

As shown in FIG. 1, a braking system 100 includes a master cylinder 104 operatively connected to a brake booster 108. As described in detail below, the master cylinder 104 includes a tube 112, which simplifies the manufacture and assembly of the braking system 100 as compared to master cylinders formed with machined castings.

Figure 2:
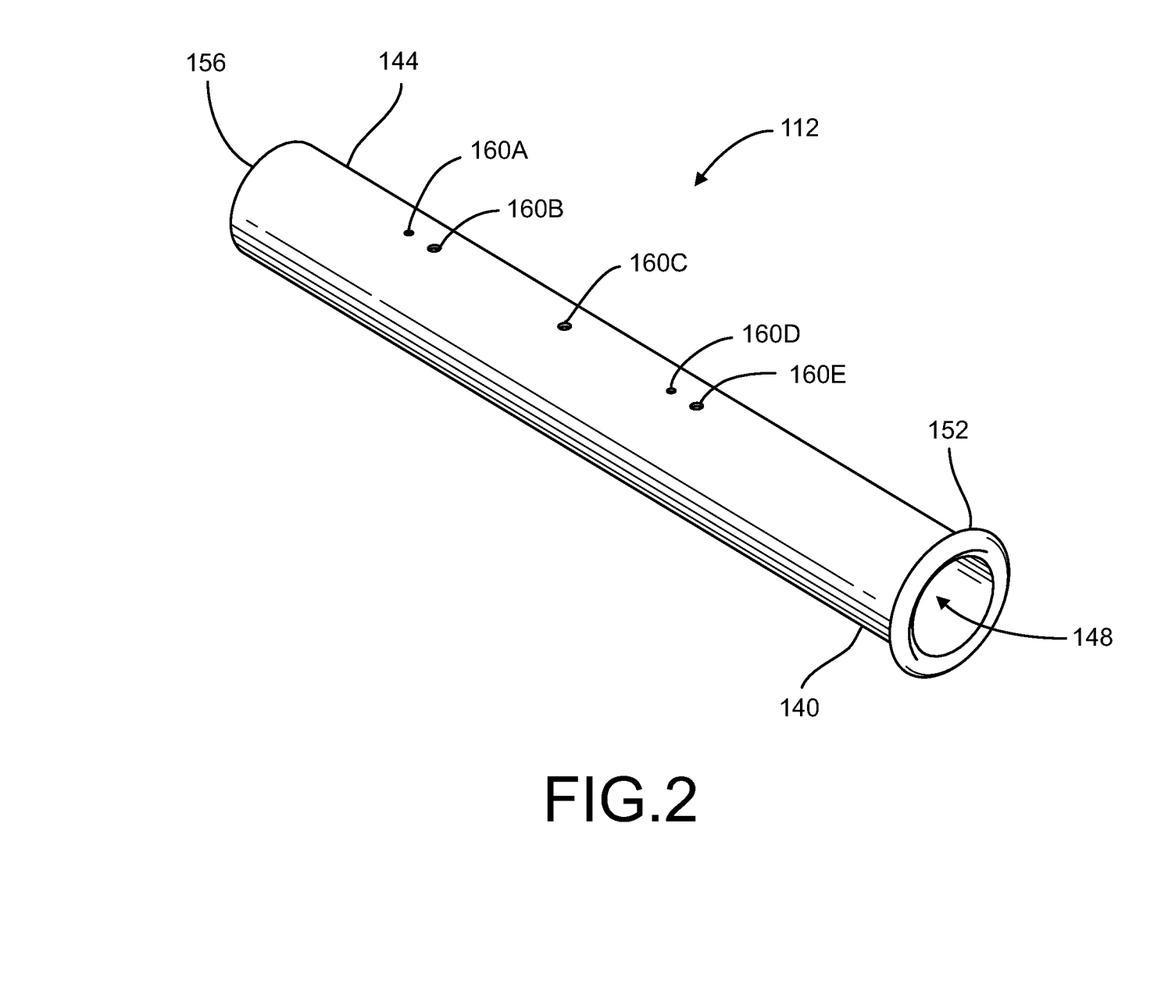
FIG. 2 is a perspective view of a tube of the master cylinder arrangement of the braking system of FIG. 1.
Figure 3:
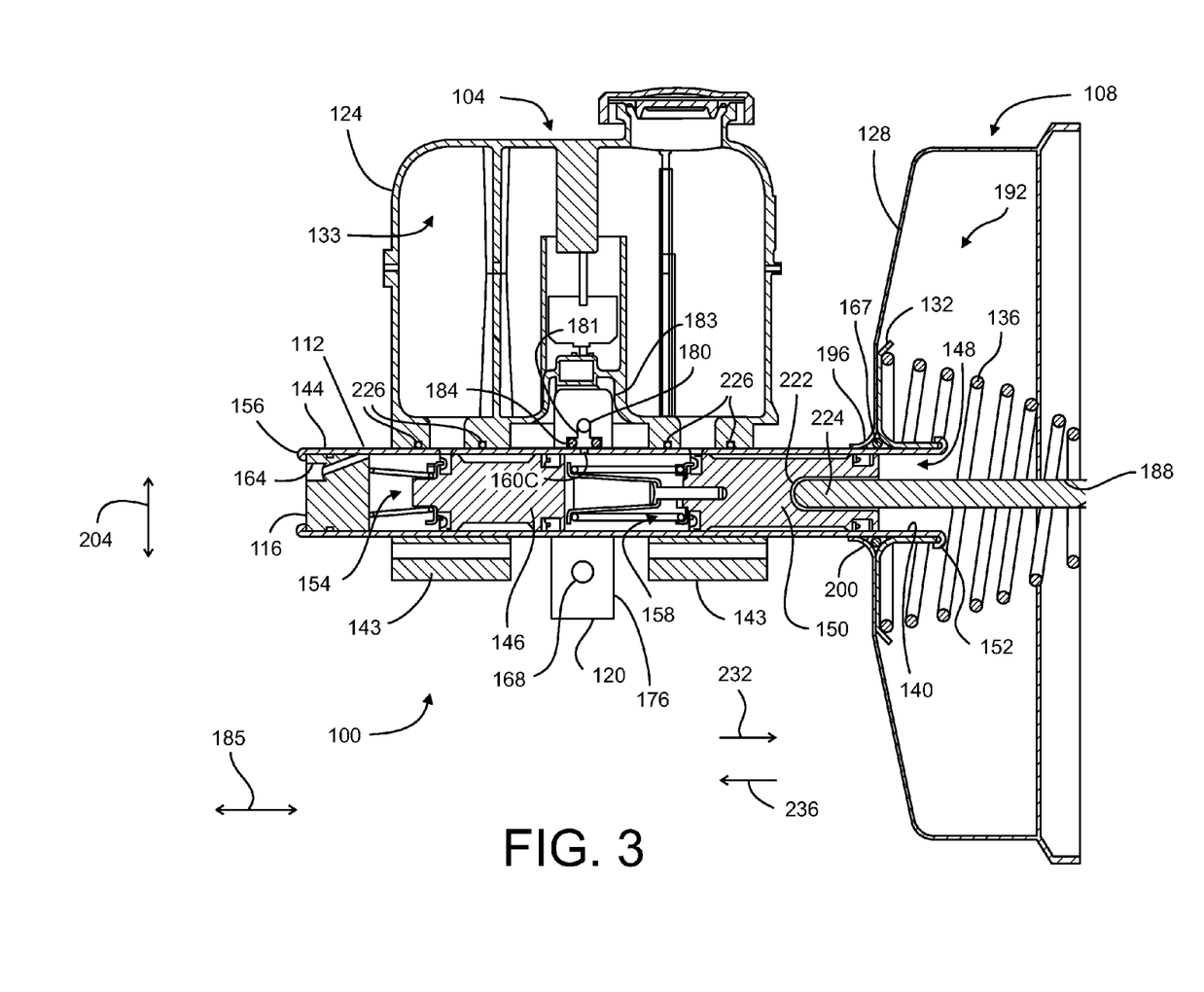
FIG. 3 is a cross sectional view of the braking system taken along the line III-III of FIG. 1.

With continued reference to FIG. 1, the master cylinder 104 includes the tube 112, a plug 116, a port structure 120, and a reservoir assembly 124. As shown in FIG. 2, the tube 112 includes a booster end 140 connected to a plug end 144 by an elongated cylindrical wall. An approximately cylindrical interior channel 148 extends from the booster end 140 to the plug end 144. The tube 112 further includes the collars 152, 156, also referred to as flanges. The collar 152, which terminates the booster end 140 and surrounds an opening of the tube 112, extends outward relative to the channel 148 and is considered to be an exterior collar. Therefore, the collar 152 has a diameter larger than the diameter of the channel 148. As shown in FIG. 3, the collar 156, which terminates the plug end 144 and surrounds an opening of the tube 112, extends inward relative to the channel 148 and is considered to be an interior collar. Therefore, the collar 156 has a diameter smaller than the diameter of the channel 148.

With continued reference to FIG. 2, the tube 112 further includes a plurality of passages 160A, 160B, 160C, 160D, 160E in fluid communication with the channel 148. The passages 160A 160B, 160D, 160E extend through the cylindrical wall of the tube 112 and enable hydraulic fluid to flow between the reservoir assembly 124 and the channel 148. The passage 160C extends through the cylindrical wall of the tube 112 and may be associated with one or more hydraulic braking cylinders (not illustrated).

Materials suitable to form the tube 112 include, but are not limited to steel, aluminum, and/or other metals and metallic alloys. The tube 112 may be formed through a process of rolling, extrusion, and/or other tube making processes. Accordingly, in at least some embodiments, the tube 112 may be formed without casting and machining in order to reduce manufacturing cost and time.

Referring again to FIG. 3, the plug 116 of the master cylinder 104 covers the opening at the plug end 144 of the tube 112. The plug 116 fits within the channel 148 and seats against the collar 156 to resist hydraulic and mechanical pressure within the tube 112. Materials suitable to form the plug 116 include, but are not limited to metal, plastic, and/or elastomeric materials. The plug 116 includes a brake line port 164, which extends through the plug 116 and couples the channel 148 to the atmosphere surrounding the braking system 100. In general, however, the port 164 connects a hydraulic brake line (not illustrated) to an external side (left side in FIG. 3) of the plug 116 to enable hydraulic brake fluid to flow between the channel 148 and a hydraulic braking cylinder (not illustrated). The port 116 may include a threaded interior to accept a coupler (not illustrated) configured to connect the brake line to the port 164. Additionally, in some embodiments, a welded joint connects the plug 116 to the tube 112. In particular, the welded joint connects the plug 116 to the collar 156 and therefore may have a generally circular shape.

As shown in FIGS. 1 and 3, the port structure 120 of the master cylinder 104 is coupled to the tube 112. The port structure 120, also referred to as a "port block" due to its shape, fluidly communicates with the channel 148 through the passage 160C (FIG. 3). Materials suitable to form the port structure 120 include but are not limited to metal, plastic, and/or other rigid materials. As shown in FIG. 1, the port structure 120 is provided as a one-piece clamp unit having a central opening 121 through which the tube 112 extends. The port structure 120 includes a front arm 172 and a rear arm 176. The upper portions of the arms 172, 176 are connected to each other; whereas, the bottom portions of the arms 172, 176 are separate from each other. Accordingly, the bottom portions of the arms 172, 176 may be separated to enlarge slightly the opening 121 and to enable the tube 112 to be easily slid through the opening 121. A fastening member 168 extends through the front arm 172 and is threadingly received by the rear arm 176. The fastening member 168 may be tightened to draw the bottom portions of the arms 172, 176 toward each other, thereby closing the opening 121 and clamping the port structure 120 to the tube 112.

The port structure 120 defines a passage 181 (FIG. 3), which leads to an opening 180 on the exterior of the port structure 120. The passage 181 and the opening 180 are configured to fluidly couple the passage 160C to the atmosphere surrounding the braking system 100. In general, the opening 180 is connected to a hydraulic brake line (not illustrated) to enable hydraulic brake fluid to flow between the channel 148 and a hydraulic braking cylinder (not illustrated). The opening 180 may include a threaded interior to accept a coupler (not illustrated) configured to connect the brake line to the port structure 120. As shown in FIG. 3, an o-ring 184 is positioned within the passage 181 to form a seal between the port structure 120 and the tube 112.

As shown in FIG. 3, two pistons 146, 150 are positioned within the channel 148 of the tube 112. The pistons 146, 150 are configured to slide within the channel 148 in response to receiving a braking force from a rod 188 associated with the booster 108. The pistons 146, 150 divide the channel 148 into at least two sub-channels 154, 158. The sub-channel 154 extends from the plug 116 to the piston 146, and the sub-channel 158 extends from the piston 146 to the piston 150. Movement of the pistons 146, 150 within the channel forces hydraulic brake fluid through the braking system 100, as known to those of ordinary skill in the art.

With continued reference to FIG. 1, the reservoir assembly 124 of the master cylinder 104 includes a reservoir 126, a clamp member 130, and another clamp member 131. As shown in FIG. 3, the reservoir 126 defines an internal space 133, which is configured to be at least partially filled with hydraulic brake fluid. The internal space 133 of the reservoir 126 is fluidly coupled to the channel 148 of the tube 112, to enable the hydraulic brake fluid to flow between the reservoir and the tube in response to movement of the pistons 146, 150.

Figure 4:
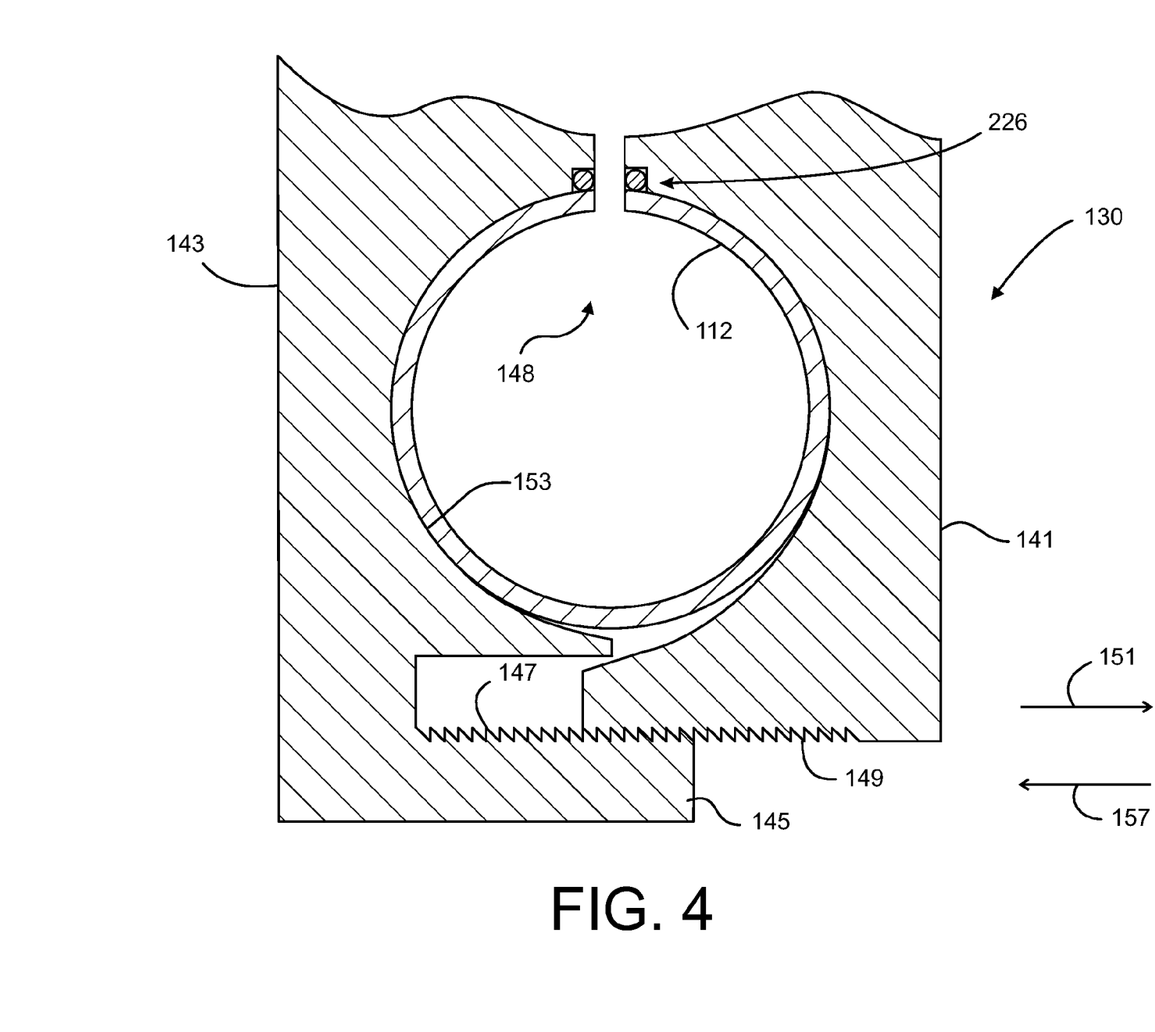
FIG. 4 is a cross sectional view of a portion of the master cylinder arrangement of the braking system taken along the line IV of FIG. 1.

The clamp members 130, 131 removably connect the reservoir assembly 124 to the tube 112. As shown in FIG. 1, the clamp members 130, 131 are an integral structure with the reservoir 126. In other embodiments, however, the clamp members 130, 131 may be distinct elements that are connected to the reservoir 126. Each of the clamp members 130, 131 includes a front arm 141, which engages a rear arm 143 to secure the reservoir assembly 124 to the tube 112. As shown in FIG. 4, the rear arm 143 includes an extension 145 having teeth 147, and the front arm 141 includes the teeth 149, which interlock with the teeth 147. When the teeth 147 are engaged with the teeth 149, the front arm 141 may move toward the rear arm 143 in the direction 157 to close the opening 153 and apply a clamping force to the tube 112. The engagement of the teeth 147, 149, however, prevents the front arm 141 from moving in the direction 151. The extension 145 may be moved to disengage the teeth 147 from the teeth 149, thereby enabling the front arm 141 to move away from the rear arm 143 in the direction 151. The opening 153 defined by the arms 141, 143 enlarges in response to the arm 141 moving away from the arm 143 to enable the clamp member 130 to be removed from the tube 112. The clamp member 131 is configured and operates exactly the same as the claim member 130.

As shown in FIGS. 3 and 4, the clamp member 130 and the clamp member 131 each include an o-ring 226, which fluidly couples the internal space 133 to the channel 148. The o-ring forms a seal between the clamp member 130 and the tube 112.

The reservoir assembly 124 may be positioned relative to the tube 112 with the port structure 120. As shown in FIG. 3, the reservoir 126 includes a recessed channel 183 which, receives the upper portion of the port structure 120. A user may position the reservoir assembly 124 relative to the tube 112, by first connecting the port structure 120 to the tube. Next, the user connects the reservoir assembly 124 to the tube 112, ensuring that the channel 183 receives the upper portion of the port structure 120. In response to the reservoir assembly 124 receiving the port structure 120 within the channel 183, the reservoir assembly becomes positioned properly in the direction 185 of FIG. 3. Additionally, the port structure 120 prevents the reservoir assembly 124 from rotating about the tube structure 112.

With continued reference to FIG. 3, the brake booster 108 includes a front shell referred to herein as a housing 128, a retention cuff 132, a spring 136, and the rod 188. The generally bowl-shaped housing 128 defines an interior chamber 192, also referred to as a cavity. A collar 196 of the housing 128 extends toward the reservoir 126 and defines a passage/opening 200 through the housing 128 to the interior chamber 192. The collar 196 extends along a length of the tube 112 to stabilize the tube 112 in response to forces imparted upon the tube 112 having a component in the directions 204 (FIG. 3) and/or the direction 201 (FIG. 1).

Figure 5:
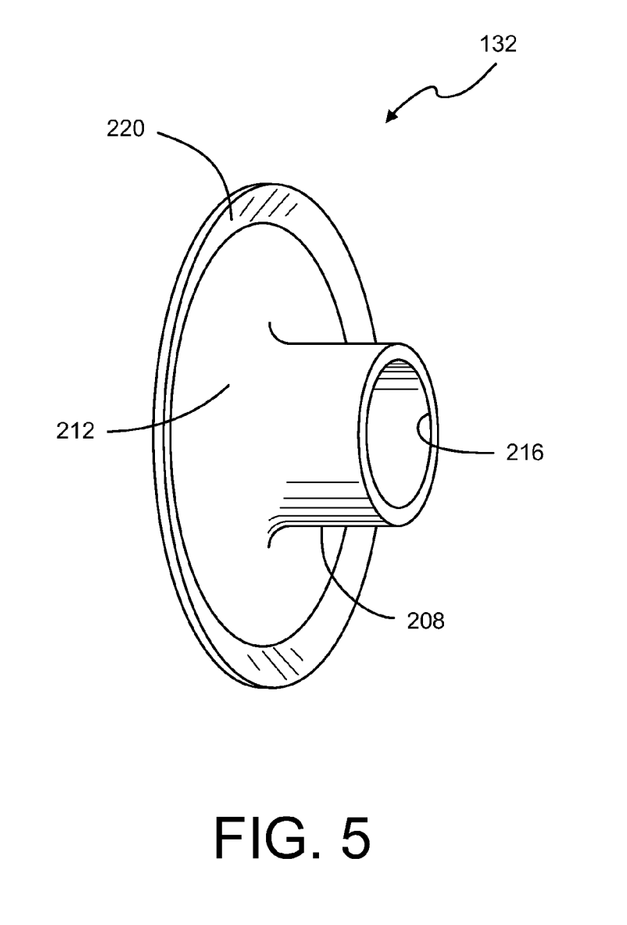
FIG. 5 is a perspective view of the retention plate of the brake booster of the braking system of FIG. 1.

The retention cuff 132 is positioned within the chamber 192 of the housing 128 and contacts an interior surface of the housing 128, as shown in FIG. 2. As shown in FIG. 5, the retention cuff 132 includes a neck 208 and a disc 212. The neck 208 has a length and defines an opening 216 through the retention cuff 132, which aligns with the opening 200. The neck 208 parallels the tube 112 to support the tube 112 in response to forces having a component in the lateral direction 201 (FIG. 1) and/or the vertical direction 204 (FIG. 3) being imparted upon the tube 112. The opening 216 has a diameter, which enables the tube 112 to pass through the opening 216, but prevents the collar 152 from passing through the opening 216. Instead, the neck 208 engages the collar 152 to prevent the tube 112 from moving in the direction 236. The disc portion 212 of the retention cuff 132 borders the neck 208 and includes a collar/flange 220 around a periphery thereof. As shown in FIG. 3, the collar 220 receives the spring 136 of the booster 108. In the embodiment of FIG. 3, the retention cuff 132 is positioned entirely within the chamber 192 defined by the housing 128 of the booster 108.

As shown in FIG. 3, an elastomeric seal 167 is positioned at the junction of the housing 128, the retention cuff 132, and the tube 112. The elastomeric seal 167 is an o-ring, which fits around the tube 112 and contacts the tube, the housing 128, and the retention cuff 132. The elastomeric seal 167 seals the chamber 192 from the atmosphere surrounding the braking system 100. Accordingly, the seal 167 enables negative pressure, as compared to the atmospheric pressure, to be developed within the chamber 192.

The spring 136 of the booster 108, as shown in FIG. 3, generates a biasing force, which acts upon a diaphragm (not illustrated) of the booster 108 as known to those of ordinary skill in the art. Additionally, the spring 136 engages the retention cuff 132 and the biasing force generated by the spring 136 biases the retention cuff 132 against the housing 128.

With continued reference to FIG. 3, the rod 188 of the booster 108 moves the pistons 146, 150 in the directions 232, 236 in response to the braking force. A cavity 222 in the piston 150 receives a master cylinder end 224 of the rod 188. The rod 188 extends through the opening at the booster end 140 of the tube 112, the opening 200 in the housing 128, the opening 216 in the retention plate 132, and through the spring 136. The rod 188 contacts the piston 150 to prevent movement of the master cylinder 104 in the direction 232.

Figure 6:
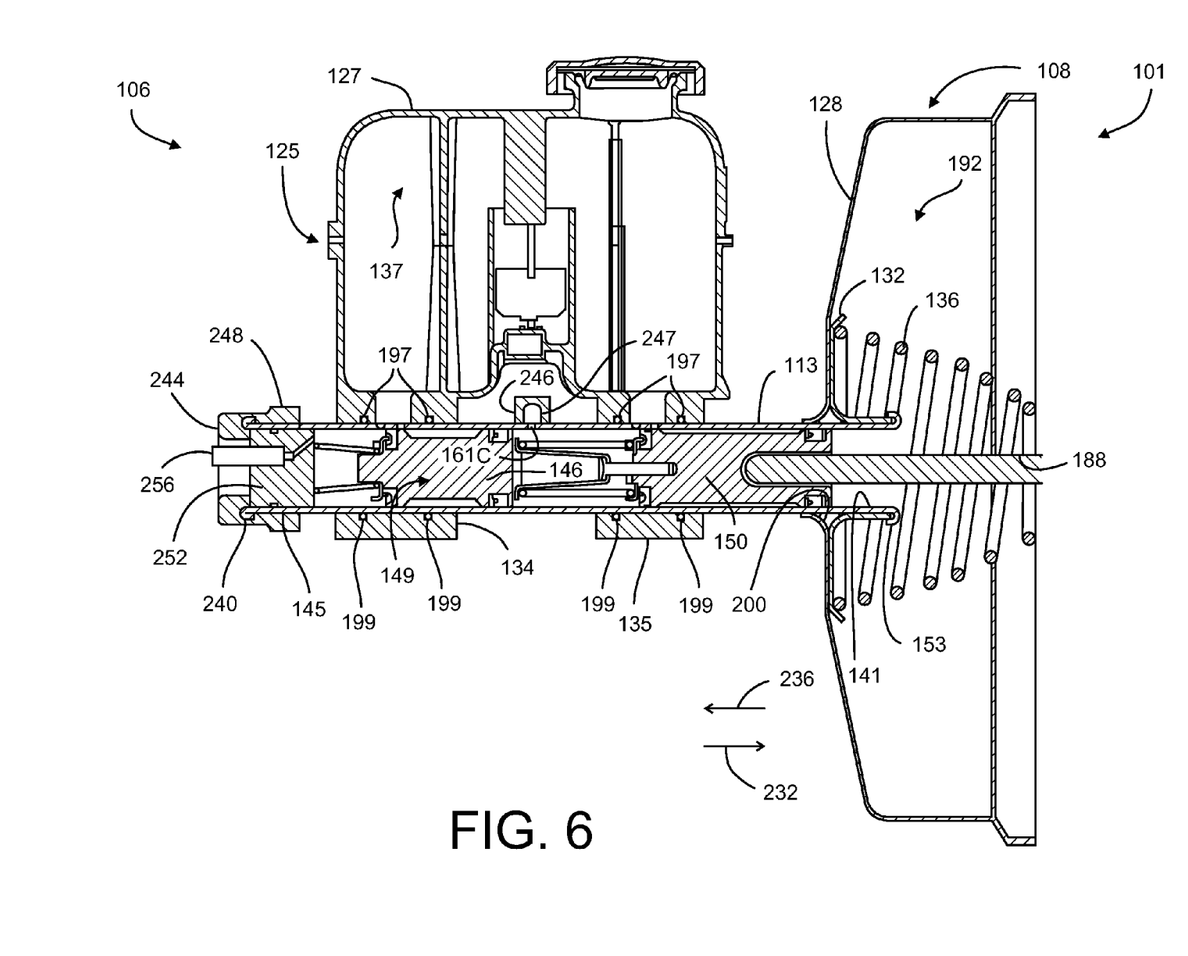
FIG. 6 is a cross sectional view of an alternative embodiment of a braking system having a brake booster and a master cylinder arrangement.
Figure 7:
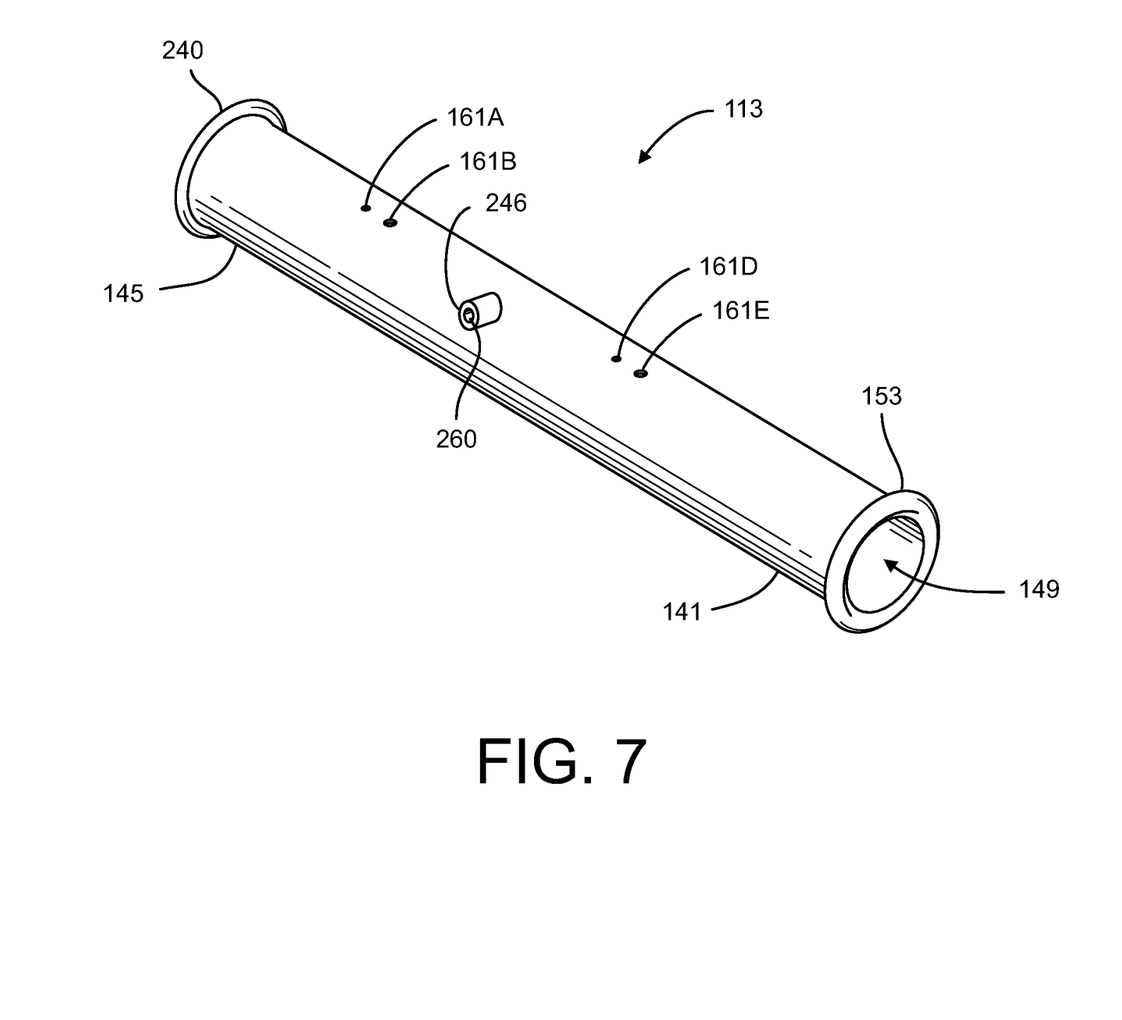
FIG. 7 is a perspective view of a tube of the master cylinder arrangement of the braking system of FIG. 5.

FIG. 6 illustrates a master cylinder 106, which is an alternative embodiment of the master cylinder 104 of the braking system 100. The master cylinder 106 includes a tube 113, a reservoir assembly 125, a plug 244, and a port protuberance 246. As shown in FIG. 7, the tube 113 includes a booster end 141 connected to a plug end 145 by an elongated cylindrical wall. An interior channel 149 extends from the booster end 141 to the plug end 145. The tube 113 further includes the collars 153, 240, which are also referred to as flanges. The collar 153, which terminates the booster end 141 and surrounds an opening of the tube 113, extends outward relative to the channel 149. Therefore, the collar 153 has a diameter larger than a diameter of the channel 149. The collar 240, which terminates the plug end 145 and surrounds an opening of the tube 113, extends outward relative to the channel 149. Therefore, the collar 240 has a diameter larger than the diameter of the channel 149. The tube 113 may be formed from the same materials as the tube 112. Accordingly, in at least some embodiments, the tube 113 may be formed without casting and machining in order to reduce manufacturing cost and time.

With continued reference to FIG. 7, the tube 113 further includes a plurality of passages 161A, 161B, 161C (FIG. 6), 161D, 161E in fluid communication with the channel 149. The passages 161A 161B, 161D, 161E extend through the cylindrical wall of the tube 113 and enable hydraulic fluid to flow between the reservoir assembly 125 of the master cylinder 106 and the channel 149. The passage 161C extends through the cylindrical wall of the tube 113 and may be associated with one or more hydraulic braking cylinders (not illustrated).

Referring again to FIG. 6, the plug 244 of the master cylinder 106 covers the opening at the plug end 145 of the tube 113. An exterior portion 248 of the plug 244 contacts the exterior of the tube 113 and the collar 240, and an interior portion 252 of the plug 244 contacts the interior of the tube 113. The plug 244 connects to the tube 113 and seats against the collar 240 to resist hydraulic and mechanical pressure within the tube 113. The plug 244 may be formed from materials including metal, plastic, and/or elastomeric materials. The plug 244 includes a port 256, which extends through the plug 244 and couples the channel 149 to the atmosphere surrounding the braking system 101. In general, however, the port 256 connects a hydraulic brake line (not illustrated) to an external side of the plug 244 to enable hydraulic brake fluid to flow between the channel 149 and a hydraulic braking cylinder (not illustrated). The port 244 may include a threaded interior to accept a coupler (not illustrated) configured to connect the brake line to the port 244.

As shown in FIGS. 6 and 7, the port protuberance 246 is connected to the tube 113. The port protuberance 246, which may also be referred to as a "boss", defines a passage 247 (FIG. 6), which fluidly couples the passage 161C to an opening 260 (FIG. 7) to enable brake fluid to flow between the channel 149 and a region exterior to the tube 113. The port protuberance 246 or second brake line port, may receive and couple a brake line to the tube 113 for fluid communication with the channel 149 through the passage 161C. To this end, the opening 260 may be a threaded opening configured to receive a coupler (not illustrated) for connecting a brake line to the port protuberance 246. The port protuberance 246 may be connected to the tube 112 of FIG. 1 in place of the port structure 120. Similarly, the port structure 120 may be connected to the tube 113 of FIG. 6 in place of the port protuberance 246. Additionally, the port protuberance 246 may be configured to contact the reservoir assembly 125 and prevent the reservoir assembly from rotating and otherwise moving relative to the tube 113.

The reservoir assembly 125 of the master cylinder includes a reservoir 127, a clamp member 134, and another clamp member 135. As shown in FIG. 6, the reservoir 127 defines an internal space 137, which is configured to be at least partially filled with hydraulic brake fluid. The internal space 137 of the reservoir 127 is fluidly coupled to the channel 149 of the tube 113, to enable the hydraulic brake fluid to flow between the reservoir and the tube in response to movement of the pistons 146, 150.

The clamp members 134, 135 removably connect the reservoir assembly 125 to the tube 113. As shown in FIG. 6, the clamp members 134, 135 are an integral structure with the reservoir 127. In other embodiments, however, the clamp members 134, 135 may be distinct elements that are connected to the reservoir 127. As shown in FIG. 6, the clamp member 134 and the clamp member 135 each include an annular interior groove 197 in which an o-ring 199 is seated. The o-rings 199 fluidly couples the internal space 137 to the channel 149.

The booster 108, and all of its associated components, is configured to operate with the master cylinder 106 of FIG. 6 in exactly the same manner that the booster 108 operates with the master cylinder 104 of FIG. 1.

The braking system 100 of FIG. 1 may be assembled according to the following process. With continued reference to FIG. 3, first, the plug 116 is inserted into the opening near the booster end 140 of the tube 112. The plug 116 slides within the channel 148 in the direction 236 to the plug end 144 of the tube 112 and contacts the collar 156. Then, the pistons 146, 150, along with other components, are inserted into the channel 148 through the opening near the booster end 140 of the tube 112. Next, the retention plate 132 is positioned within the chamber 192 against the interior surface of the housing 128, such that the opening 200 in the housing 128 aligns with the opening 216 in the retention plate 132. In some embodiments, the spring 136 maintains the position of the retention plate 132 relative to the housing 128. In other embodiments, however, the retention plate 132 may be fastened to the housing 128. For example, the retention plate 132 may be spot welded to the interior surface of the housing 128. Spot welding fastens the retention plate 132 to the housing 128 without perforating the retention plate or the housing. Thereafter, the tube 112 having the internal components installed therein, is inserted through the opening 216 in the retention plate 132 and the opening 200 in the housing 128 until the collar 152 is seated against the neck 208 of the retention plate 132 and the booster end 140 is exposed to the interior cavity 192. Afterwards, the spring 136 may be biased against the collar 220 of the retention plate 132 to secure the position of the retention plate 132 relative to the housing 128. Subsequently, the rod 188 is inserted into the cavity 222 in the piston 150. Accordingly, the retention plate 132, the spring 136, and the housing 128 connect the booster 108 to the master cylinder 104 without screws, bolts, rivets, or, in some embodiments, welds. After the retention plate 132 is biased against the housing 128 and the piston 150 receives the rod 118, the position of the tube 112 relative to the booster 108 becomes fixed. Next, the port structure 120 is connected to the tube 112 in a position, which enables the port structure 120 to fluidly communicate with the channel 148 through the passage 160C. The position of the port structure 120 assists in connecting the reservoir assembly 124 to the tube 112. In response to receiving the port structure 120, the reservoir assembly 124 is positioned to fluidly communicate with the passages 160A, 160B, 160D, 160E.

The braking system 101 having the master cylinder 106 of FIG. 6 may be assembled in a similar manner. First, the retention plate 132 is positioned within the chamber 192 against the interior surface of the housing 128, such that the opening 200 in the housing 128 aligns with the opening 216 in the retention plate 132. Next, the booster 108 receives the tube 113 in a "pre-formed" state. The tube 113 in the preformed state does not include the external collar 240, thereby enabling the tube 113 to pass through the opening 200 in the housing 128 and the opening 216 in the retention plate 132. Next, the port protuberance 246 is welded to the tube 113 to enable the opening 260 to communicate fluidly with the passage 161C. Thereafter, the pistons 146, 150 and other internal components may be inserted into the channel 149. Next, the reservoir assembly 125 is connected to the tube 113 to communicate fluidly with the passages 161A, 161B, 161D, 161E. Subsequently, the collar 240 is formed on the tube 113. Next, the plug 244 is connected to the plug end 145 of the tube 113 to close end of the tube. If the master cylinder 106 requires maintenance or servicing after assembly, a user may remove the plug 244 and access and/or replace components positioned within the channel 149, such as the pistons 146, 150.

In operation, the braking system 100 of FIG. 1 may operate hydraulic cylinders (not illustrated) in response to the booster 108 receiving a braking force. Specifically, application of a braking force moves the output rod 188 and the pistons 146, 150 in the direction 236 to generate pressurized hydraulic brake fluid, which activates the hydraulic cylinders. In response to cessation of the braking force, the spring 136 biases the rod 188 in the direction 232, and the pistons 146, 150 move in the direction 232 to deactivate the hydraulic cylinders. The braking system 101 of FIG. 6 operates in the same manner.

Figure 8:
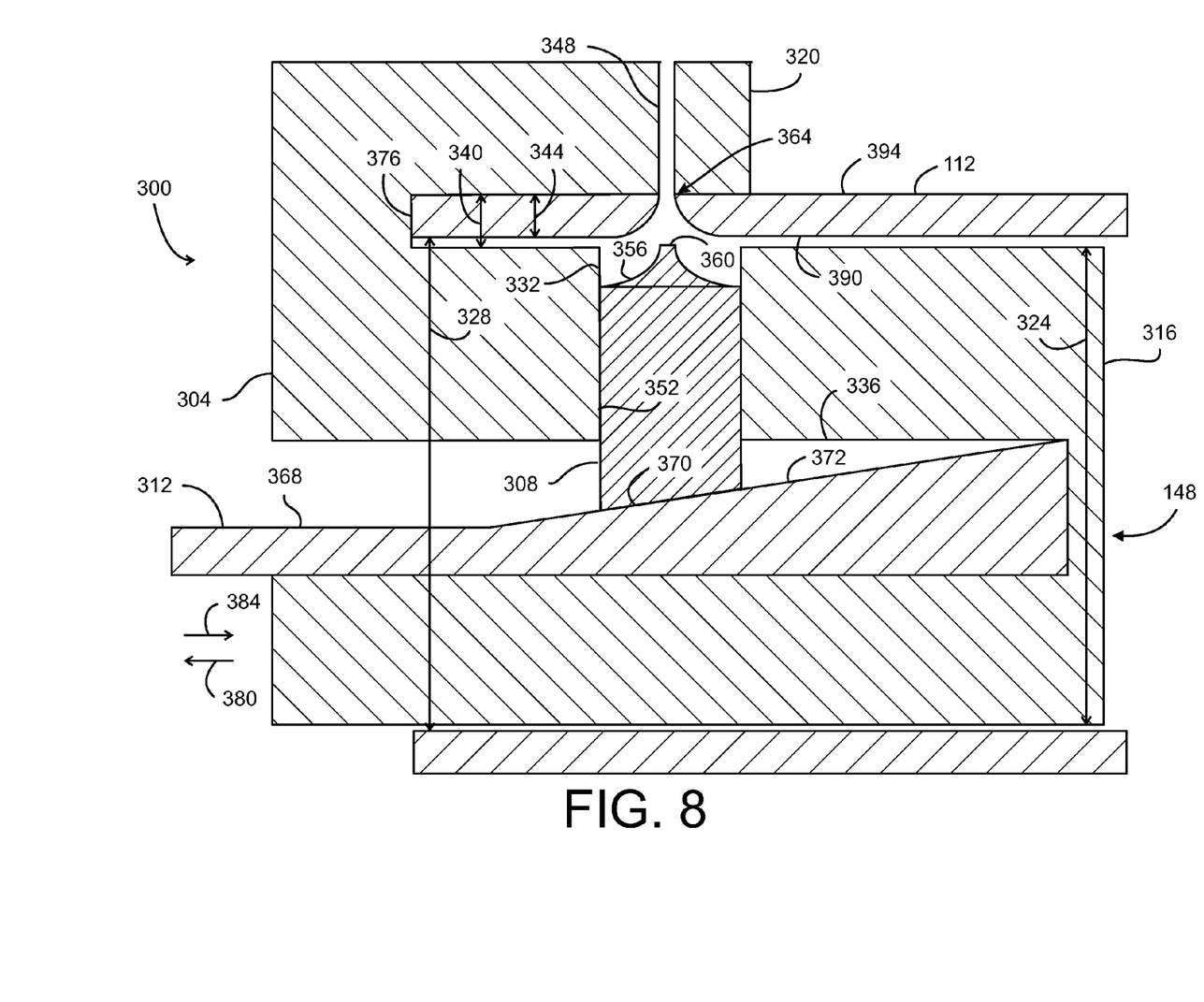
FIG. 8 is a cross sectional view of a punch assembly configured for use in the manufacture of the tube of FIG. 2 and the tube of FIG. 7.

As shown in FIG. 8, a punch assembly 300 may be configured to form the passages 160A, 160B, 160C, 160D, 160E the in the tube 112 and/or form the passages 161A, 161B, 161C, 161D, 161E in the tube 113. The assembly 300 is described with reference to the tube 112. The punch assembly 300 includes a body 304 or support frame 304, a punch 308, and a slider 312 or slide shaft 312. The body 304 movably supports the punch 308 and the slider 312. The body 304 includes a lower portion 316 and an upper portion 320. The lower portion 316 is designed and dimensioned to fit snugly within the channel 148 with little or no movement in the vertical direction. In the embodiment of FIG. 8, the lower portion 316 has a height 324, which is slightly less than the diameter 328 of the tube 112 to enable the lower portion to enter the channel 148. Additionally, at least a portion of the lower portion 316 may contact the inner surface of the tube 112. The lower portion 316 defines a punch channel 332, which fluidly communicates with a slider channel 336. The upper portion 320 is spaced apart from the lower portion by a distance 340 slightly greater than the thickness 344 of the wall of the tube 112. The upper portion 320 defines an exit channel 348. The upper portion 320 is not configured to enter the channel 148. The upper portion 320 may contact a portion of the exterior surface of the tube 112.

The punch 308 is movably received by the punch channel 332 of the lower portion 316. The punch 308 includes a punch body 352, a coining surface 356, and a projection 360 or port forming member 360. The punch body 352 is approximately the same width as the punch channel 332 such that the punch 308 moves vertically within the punch channel 332 with little or no movement in the horizontal direction. The coining surface 356 is formed with a radius such that the area surrounding the resultant circular passage 364 has a slight countersink surface. The projection 360, which is circular, has a diameter approximately equal to the diameter of the passage 364. The punch body 352 as an inclined bottom surface 370. The punch 308 is formed of a material harder than the material used to form the tube 112.

The slide 312 is movably received by the slide channel 336 of the lower portion 316. The slide 312 includes an end portion 368 and an incline 372. The end portion 368 is connected to a prime mover (not illustrated) configured to move the slide horizontally. The incline 372 is formed to match the bottom surface 370 of the punch 308.

The punch assembly 300 may be operated to form the passages 160A, 160B, 160C, 160D, 160E in the tube 112 according to the following process. First, the lower portion 316 is positioned within the channel 142, either by moving the punch assembly 300 or the tube 112. In particular, the tube 112 contacts the wall 376, which acts as a stopper and positions the punch 308 relative to the tube 112. Next, the prime mover is activated to move the slider 312 in the direction 380. As the slider 312 moves in the direction 380 the incline 372 moves the punch 308 toward the desired passage location. Continued movement of the slider 312 in the direction 380 forces the projection 360 through the wall of the tube 112 and forces the coining surface 356 against the wall of the tube 112. The projection 360 forms the passage 364 and the coining surface 356 countersinks the area surrounding the passage 364. The upper portion 320 stabilizes the tube 112 to ensure that the projection 360 punches through the tube 112 instead of just deforming the tube 112. Next, the prime mover is activated to move the slider in the direction 384. As the slider 312 moves in the direction 384 gravity pulls the punch 308 downward. Thereafter, the tube 112 and/or the punch assembly 300 may be repositioned to form additional passages. Once all of the passages have been formed the tube 112 is removed from the punch assembly 330.

The punch assembly 300 forms the passages 160A, 160B, 160C, 160D, 160E by striking an inner surface 390 of tube 112. Therefore, the punch assembly 300 prevents burrs, sharp edges, and other irregularities from protruding within the channel 148, such as may occur if the passages were formed by striking an outer surface 394 of the tube and forcing the punch toward the channel 148. The passages formed by the punch assembly 300 enable the pistons 146, 150 to slide within the channel 148 without seals of the pistons catching or snagging on the passages.

The device described herein has been illustrated and described in detail in the figures and foregoing description, the same should be considered as illustrative and not restrictive in character. It is understood that only the preferred embodiments have been presented and that all changes, modifications, and further applications that come within the spirit of the device described herein are desired to be protected.

What is claimed is:

1. A brake system comprising:
   a brake booster including
      a housing defining a passage to an interior chamber,
      a retention cuff positioned in the interior chamber about the passage, and
      a spring engaging the retention cuff in the interior chamber; and
   a master cylinder arrangement including
      a tube member having a wall, a first end and a second end, the tube member extending through the passage and the retention cuff such that the first end of the tube member is exposed to the interior chamber of the brake booster, and
      a brake fluid reservoir in fluid communication with the tube member, wherein a first opening is defined at the first end of the tube member and a second opening opposed to the first opening is defined at the second end of the tube member, the second opening including one of an interior collar and an exterior collar, and
      a plug disposed within the tube member and covering the second opening of the tube member, the plug including a first brake line port configured to allow brake fluid to flow from an interior of the tube member to an exterior of the tube member wherein the first brake line port is located on an end of the plug and is inaccessible through the wall of the tube member.

2. The brake system of claim 1 wherein the plug is welded to the second end of the tube member.

3. The brake system of claim 1 wherein the second opening in the tube member includes the exterior collar and an exterior portion of the plug is positioned on the exterior of the tube member at the second end of the tube member.

4. The brake system of claim 1 wherein the wall includes an elongated cylindrical wall with a first opening at the first end of the tube member and a second opening opposed to the first opening at the second end of the tube member, the elongated cylindrical wall including a plurality of passages in fluid communication with the brake fluid reservoir.

5. The brake system of claim 4 wherein at least one piston is positioned within the tube member, the at least one piston connected to a rod that extends through the first opening and moves in an axial direction when a brake pedal is depressed.

6. The brake system of claim 1, the tube member further comprising:
   a second brake line port configured to allow brake fluid to flow from an interior of the tube member to an exterior of the tube member, the second brake line port being positioned between the first end of the tube member and the second end of the tube member.

7. The brake system of claim 6, wherein the second brake line port is welded to the tube member.

8. A brake system comprising:
a brake booster including
a housing defining a passage to an interior chamber,
a retention cuff positioned in the interior chamber about the passage, and
a spring engaging the retention cuff in the interior chamber; and
a master cylinder arrangement including
a tube member having a first end and a second end, the tube member extending through the passage and the retention cuff such that the first end of the tube member is exposed to the interior chamber of the brake booster, and
a brake fluid reservoir in fluid communication with the tube member, wherein a first opening is defined at the first end of the tube member, the first opening including an exterior collar that engages the retention cuff.

9. The brake system of claim 8 wherein the exterior collar is provided by an outwardly extending flange on the first end of the tube member.

10. The brake system of claim 9 wherein the retention cuff includes a neck with a disc portion positioned about the neck, the disc portion engaging an interior surface of the housing and the neck engaging the outwardly extending flange on the first end of the tube member.

11. A brake system comprising:
a brake booster including a housing defining a passage to an interior chamber;
a master cylinder arrangement including a tube member having a wall, a first opening at a first end and an opposing second opening at a second end, the tube member extending through the passage in the brake booster such that the first end of the tube member is exposed to the interior chamber of the brake booster, wherein the second opening in the tube member includes one of an interior collar and an exterior collar;
a brake fluid reservoir in fluid communication with the tube member; and
a plug covering the second opening in the tube member, the plug including a brake line port configured to allow brake fluid to flow from an interior of the tube member to an exterior of the tube member wherein the brake line port is located on an end of the plug and is inaccessible through the wall.

12. The brake system 11 wherein the second opening in the tube member includes the interior collar and the plug is positioned within the tube member at the second end of the tube member.

13. The brake system of claim 11 wherein the second opening in the tube member includes the exterior collar and an exterior portion of the plug is positioned on the exterior of the tube member at the second end of the tube member.

14. A brake system comprising:
a brake booster including a housing defining a passage to an interior chamber;
a master cylinder arrangement including a tube member having a first opening at a first end and an opposing second opening at a second end, the tube member extending through the passage in the brake booster such that the first end of the tube member is exposed to the interior chamber of the brake booster;
a brake fluid reservoir in fluid communication with the tube member; and
a plug covering the second opening in the tube member, the plug including brake line port configured to allow brake fluid to flow from an interior of the tube member to an exterior of the tube member, wherein the first end of the tube member includes an exterior collar having a diameter that is larger than the passage to the interior chamber in the housing.

15. The brake system of claim 14 further comprising a retention cuff including a neck portion that engages the exterior collar on the tube member and a disc portion that engages the housing.

16. A method of forming a port in a master cylinder tube member comprising:
engaging the master cylinder tube member with a support frame such that a first portion of the support frame is positioned within a channel of the master cylinder tube member and a second portion of the support frame is positioned to overlap a portion of an exterior surface of the master cylinder tube member; and
piercing the tube member with a port forming member from within the channel to form a port in the master cylinder tube member, the port forming member being slidably received by the first portion of the support frame.

17. The method of forming a port in a master cylinder tube member of claim 16, the piercing the tube member with a port forming member further comprising:
moving a slide shaft to cause the port forming member to pierce the master cylinder tube member, a first portion of the slide shaft being received by the first portion of the support frame, and a second portion of the slide shaft being positioned outside of the channel; and
forming a countersink associated with the port with a countersink surface of the port forming member.

* * * * *